(12) United States Patent
Tsuchikawa

(10) Patent No.: US 7,822,316 B2
(45) Date of Patent: Oct. 26, 2010

(54) DIGITAL VIDEO RECORDER TO BE CONNECTED TO DV CAMCORDER VIA IEEE 1394 SERIAL BUS

(75) Inventor: Tatsuyosi Tsuchikawa, Daito (JP)

(73) Assignee: Funai Electric Co., Ltd., Daito-shi (JP)

(*) Notice: Subject to any disclaimer, the term of this patent is extended or adjusted under 35 U.S.C. 154(b) by 1105 days.

(21) Appl. No.: 11/505,329

(22) Filed: Aug. 17, 2006

(65) Prior Publication Data

US 2007/0041717 A1 Feb. 22, 2007

(30) Foreign Application Priority Data

Aug. 19, 2005 (JP) ............................. 2005-238384

(51) Int. Cl.
*H04N 5/91* (2006.01)
*H04N 7/00* (2006.01)
*H04N 5/00* (2006.01)

(52) U.S. Cl. ..................... 386/68; 386/46; 386/69; 386/81; 386/95; 386/117

(58) Field of Classification Search .............. 386/68, 386/46, 69, 81, 95, 117
See application file for complete search history.

(56) References Cited

U.S. PATENT DOCUMENTS

| | | | |
|---|---|---|---|
| 6,564,002 B1* | 5/2003 | Murakami et al. | 386/52 |
| 6,795,640 B1* | 9/2004 | Honda | 386/95 |
| 7,292,770 B2* | 11/2007 | Nakano et al. | 386/46 |
| 2001/0031131 A1* | 10/2001 | Fukai et al. | 386/52 |
| 2003/0190137 A1* | 10/2003 | Pesce | 386/46 |
| 2004/0120696 A1* | 6/2004 | Solomon et al. | 386/117 |

FOREIGN PATENT DOCUMENTS

| | | |
|---|---|---|
| JP | 2002-184057 A | 6/2002 |
| JP | 2004-95050 A | 3/2004 |

* cited by examiner

*Primary Examiner*—Thai Tran
*Assistant Examiner*—Daquan Zhao
(74) *Attorney, Agent, or Firm*—Crowell & Moring LLP

(57) ABSTRACT

A DVD recorder acquires a time code from a DV camcorder that is in process of rewinding a DV tape in response to a rewind command, and calculates a difference between a current rewind position and a beginning position on the DV tape. When the difference is smaller than a first reference value, the DVD recorder changes a command to be issued to the DV camcorder into a step reverse command. Subsequently, the DVD recorder acquires time codes before and after the DV camcorder executes a step reverse operation, and compares the two time codes. When no change is found between the two time codes six consecutive times as a result of comparisons, the DVD recorder determines that the DV tape in the DV camcorder has been completely rewound. This allows the DVD recorder to correctly recognize the completion of the rewind of the DV tape in the DV camcorder.

7 Claims, 3 Drawing Sheets

DIGITAL VIDEO RECORDER TO BE CONNECTED TO DV CAMCORDER VIA IEEE 1394 SERIAL BUS

BACKGROUND OF THE INVENTION

1. Field of the Invention

The present invention relates to a digital video recorder such as a digital versatile disc (DVD) recorder, a hard disc drive (HDD) recorder, a digital video cassette recorder (VCR), and the like that can be connected to a digital video (DV) camcorder via an IEEE 1394 serial bus so as to record DV streams sent from the DV camcorder.

2. Description of the Related Art

It is known to connect a digital video recorder such as a DVD recorder, a HDD recorder, or the like to a DV camcorder via an IEEE 1394 serial bus for, e.g., copying data captured on a DV tape in the DV camcorder to the DVD recorder or the HDD recorder. Where a DV camcorder and a digital video recorder are connected to each other via an IEEE 1394 serial bus, the digital video recorder serves as a controller, which allows a user to copy data from the DV camcorder to the digital video recorder only by entering a command into the digital video recorder. This is hereinafter called "program dubbing".

More particularly, when a user enters a command for program dubbing into the digital video recorder by operating input means such as a remote control, the digital video recorder first issues a command to rewind a DV tape to the DV camcorder so that the DV tape in the DV camcorder is rewound to the beginning. When the digital video recorder recognizes that the DV tape has been rewound to the beginning based on a time code acquired from the DV camcorder, the digital video recorder then issues a play command to the DV camcorder so as to instruct the DV camcorder to reproduce data from the DV tape. With the reproduction, the DV camcorder sends, to the digital video recorder, DV streams, which are recorded on a digital recording medium such as a DVD, a hard disk, or the like in the digital video recorder.

Some kinds of program dubbings allow setting of a recording time for copying data from a DV tape to a digital video recorder (for example, allows 30 minutes of video to be copied from the beginning of the DV tape).

Further, in a conventional system, a personal computer is connected to a plurality of DV camcorders so that the personal computer can be used to control editing of video and audio data recorded on the DV camcorders (see, for example, Japanese laid-open patent publication 2002-184057). When locating the beginning of data on a DV tape, the system changes the rewind speed stepwise based on a difference between the target position on the DV tape and the current position on the DV tape.

Conventional digital video recorders determine that rewind of a DV tape has been completed, if a time code acquired from a DV camcorder is either "00:00:00:00" or "-:-:-:-". Otherwise, the digital video recorders determine that the rewind has not been completed yet.

When determining that the rewind of the DV tape was not properly completed, the digital video recorders stop the program dubbing sequence without issuing a play command to the DV camcorder. The reason for stopping the operation requested by a user is as follows. Even though the program dubbing is set, a user may possibly press a button to stop rewinding a DV tape in the DV camcorder by mistake during the actual operation. Usually in such a case, the DV tape is not completely rewound to the beginning. Therefore, if the program dubbing is continued (i.e., if a play command is issued to the DV camcorder) even in such a case, the copy may be incomplete with video/audio data near the beginning of the DV tape missing or not recorded.

In order to copy video/audio data recorded on a DV tape to a digital video recorder properly from the beginning, the digital video recorder needs to determine whether or not a time code acquired from a DV camcorder is a predetermined value (e.g. "00:00:00:00"). However, the following trouble may occur in the conventional system. There is a case where the digital video recorder acquires only an improper time code such as "00:00:00:04" from a DV camcorder although a DV tape has been properly rewound to the beginning. In this case, the digital video recorder cannot recognize the proper completion of the rewind of the DV tape. Therefore, the digital video recorder may stop the sequential process such as program dubbing.

Whether the above described trouble occurs or not depends on the model of a DV camcorder connected to the digital video recorder or on the operating condition. In view of that, one possible cause of the trouble is that the timing of acquisition of a time code from a DV camcorder by the digital video recorder does not coincide with the timing of operation on the DV camcorder. More particularly, the trouble may occur because the digital video recorder acquires a time code before a DV tape is actually rewound to the beginning, and the acquired time code is not updated but kept as a final time code in a memory in the digital video recorder.

SUMMARY OF THE INVENTION

An object of the present invention is to provide a digital video recorder to be connected to a DV camcorder via an IEEE 1394 serial bus that can properly recognize the completion of a rewind of a DV tape in the DV camcorder.

According to a first aspect of the present invention, this object is achieved by a digital video recorder to be connected to a digital video (DV) camcorder via an IEEE 1394 serial bus, comprising: command issuing means for issuing operation commands to the DV camcorder, the operation commands including a command to rewind a DV tape and a pause command; time code acquiring means for acquiring a time code from the DV camcorder that is in process of rewinding the DV tape in response to a rewind command issued by the command issuing means; calculation means for calculating a difference between a current rewind position and a beginning position on the DV tape based on the time code acquired by the time code acquiring means; step reverse command issuing means for changing a command to be issued to the DV camcorder by the command issuing means into a step reverse command when the difference between the current rewind position and the beginning position on the DV tape, which is calculated by the calculation means, is smaller than a first reference value; comparing means for, when a step reverse operation is executed in response to a step reverse command issued by the step reverse command issuing means, comparing a time code acquired from the DV camcorder before the execution of the step reverse command with a time code acquired from the DV camcorder after the execution of the step reverse command; and rewind completion recognizing means for recognizing completion of the rewind of the DV tape when the time codes before and after the execution of the step reverse command match as a result of the comparison by the comparing means.

With the above configuration, the digital video recorder can correctly recognize the completion of rewind of a DV tape in a DV camcorder. Accordingly, the digital video recorder can smoothly proceed to a process next to the rewind, e.g., dubbing from the DV camcorder to the digital video recorder.

Preferably, the digital video recorder further comprises: repeat means for causing the step reverse command issuing means to repeatedly issue the step reverse command until number of times time codes before and after execution of the step reverse command match as a result of the comparison by the comparing means reaches a predetermined number, wherein when the time codes match a plural number of times in succession as a result of the repeat by the repeat means, the rewind completion recognizing means recognizes the completion of the rewind of the DV tape.

Preferably, the digital video recorder further comprises command changing means for changing stepwise a command to be issued to the DV camcorder by the command issuing means so as to slow down speed of the rewind with decrease of the difference between the current rewind position and the beginning position on the DV tape that is calculated by the calculation means.

Preferably, the digital video recorder proceeds to a process of copying data from the DV camcorder when the rewind completion recognizing means recognizes the completion of the rewind of the DV tape.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Referring now to the accompanying drawings, a preferred embodiment of the present invention is described. The present invention is applied to a DVD recorder in the embodiment described below. It is to be noted that the following description of preferred embodiment of the present invention has been presented for purposes of illustration and description, and is not intended to be exhaustive or to limit the present invention to the precise form disclosed.

Figure 1:
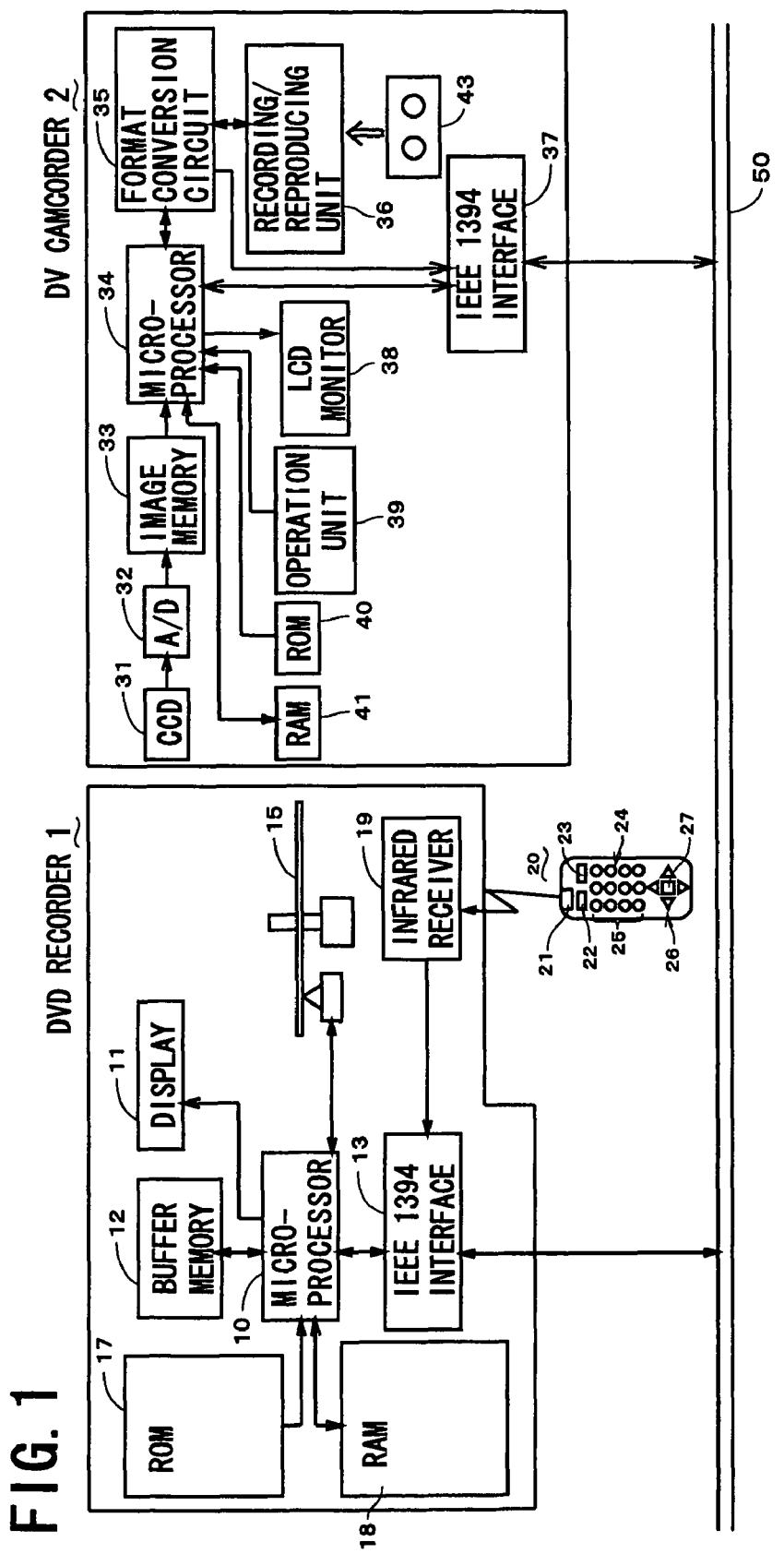
FIG. 1 is an electrical block diagram of an DVD recorder according to one embodiment of the present invention as well as a DV camcorder connected to the DVD recorder via an IEEE 1394 serial bus.

FIG. 1 is an electrical block diagram of a DVD recorder 1 according to this embodiment as well as a DV camcorder 2 that can be connected to the DVD recorder 1 via an IEEE 1394 serial bus 50. The DVD recorder 1 is connected to the DV camcorder 2 via the IEEE 1394 serial bus (hereinafter, referred to simply as "bus") 50 so as to receive stream data from the DV camcorder 2 and record the data on a DVD 15 in the DVD recorder 1. The DVD recorder 1 comprises a microprocessor 10 to control each component therein. The DVD recorder 1 further has an IEEE 1394 interface (hereinafter, referred to as "IEEE 1394 I/F") 13, a display 11 to display various messages, a RAM 18 to store data such as a time code acquired from the DV camcorder 2, and a buffer memory 12 to temporarily store data to be recorded and data read.

The IEEE 1394 I/F 13 is used to send and receive a control command and a response thereto as well as stream data between the DVD recorder 1 and external input/output devices via the bus 50. The DVD recorder 1 further has an infrared receiver 19 to receive an infrared signal transmitted from a remote control 20. The microprocessor 10 is connected to a ROM 17, in which various programs for instructing the DV camcorder 2 to execute various operations are stored including a program for rewinding a DV tape 43 in the DV camcorder 2, which is described later in detail.

The remote control 20 has an infrared transmitter 21 and a key portion 24, where arranged are various keys such as a power key 22, numeric keys 25, cursor keys 26, an enter key 27, and a menu key 23 for requesting display of various menus including a menu to be used for a request to copy data from the DV tape 43 in the DV camcorder 2 to the DVD recorder 1.

The DV camcorder 2 is a DV camera with a built-in video cassette recorder (VCR), and comprises: an IEEE 1394 interface (hereinafter, referred to as "IEEE 1394 I/F") 37 to receive data such as an operation command from the DVD recorder 1 via the bus 50; a charge coupled device (CCD) 31 to output a captured image in the form of analog signal; an analog to digital (A/D) converter 32 to convert an analog signal sent from the CCD 31 into a digital signal; an image memory 33 to temporarily store image data sent from the A/D converter 32; a microprocessor 34 to process the image data stored in the image memory 33 in various ways; a format conversion circuit 35; and a recording/reproducing unit 36.

The format conversion circuit 35 converts the format of image data processed by the microprocessor 34 into stream data. The recording/reproducing unit 36 writes stream data sent from the format conversion circuit 35 onto the DV tape 43 and reproduces stream data recorded on the DV tape 43. The DV camcorder 2 further comprises: a liquid crystal display monitor 38 to display an image sent from the microprocessor 34; an operation unit 39, a RAM 41 to store various kinds of data; and a ROM 40 to store various kinds of control programs.

Now assume that a user presses the menu key 23 on the remote control 20 to display the menu on the display 11 of the DVD recorder 1 and selects "Program Dubbing" from among operations shown on the menu. In response to the selection, the DVD recorder 1 reads out a control program for program dubbing among the programs stored in the ROM 17 and issues appropriate operation commands to the DV camcorder 2 in accordance with the read program. When receiving the operation commands via the IEEE 1394 I/F 13 and the bus 50, the DV camcorder 2 first rewinds the DV tape 43 to the beginning, and reproduces data from the DV tape 43 in response to a play command sent from the DVD recorder 1 after the DVD recorder 1 has recognized the completion of the rewind. While reproducing the data, the DV camcorder 2 sends stream data to the DVD recorder 1 via the bus 50. The stream data is then recorded onto the DVD 15 in the DVD recorder 1.

Figure 2:
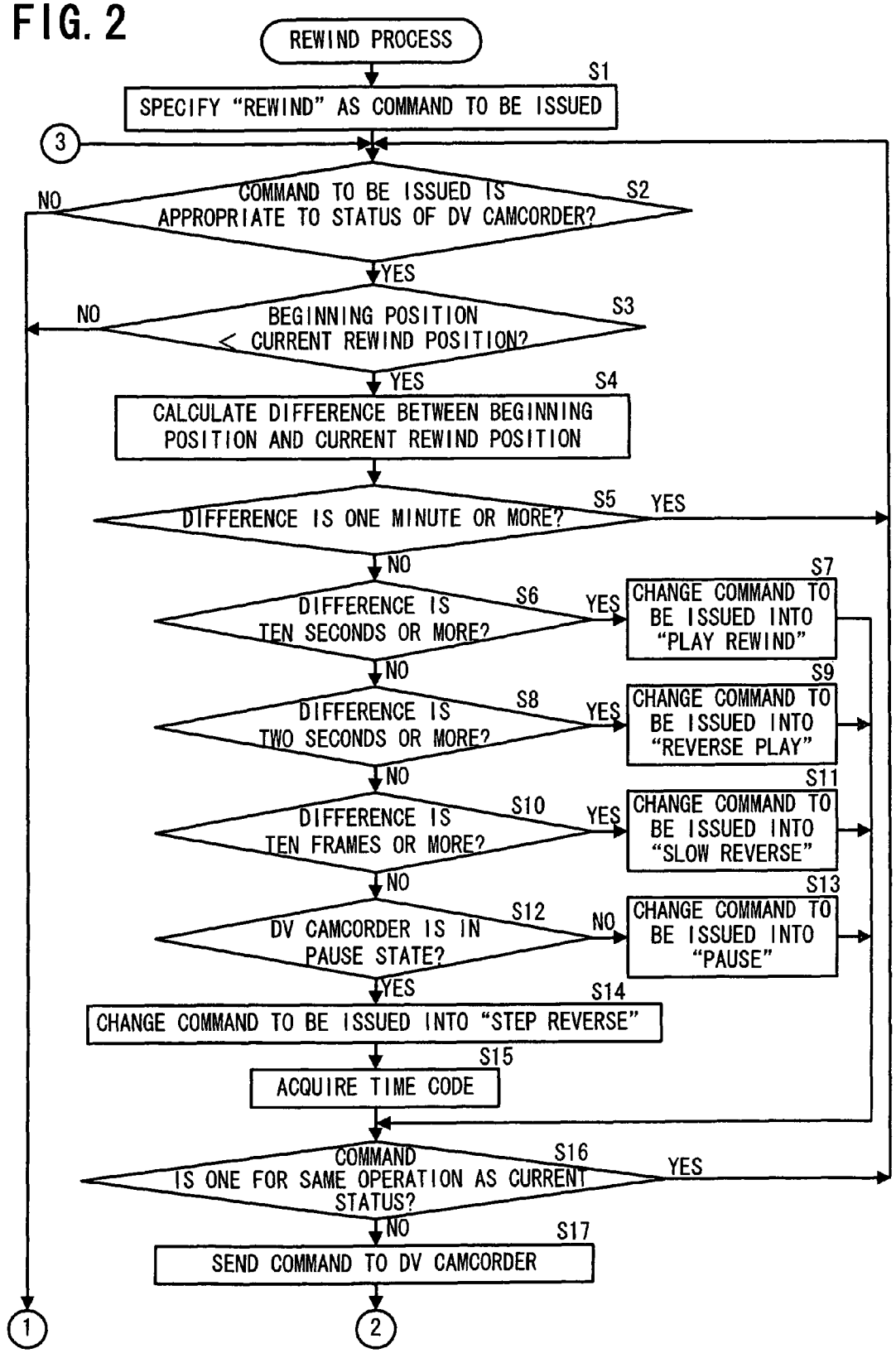
FIG. 2 is a flowchart showing a rewind process (first part) to be executed by the DVD recorder.
Figure 3:
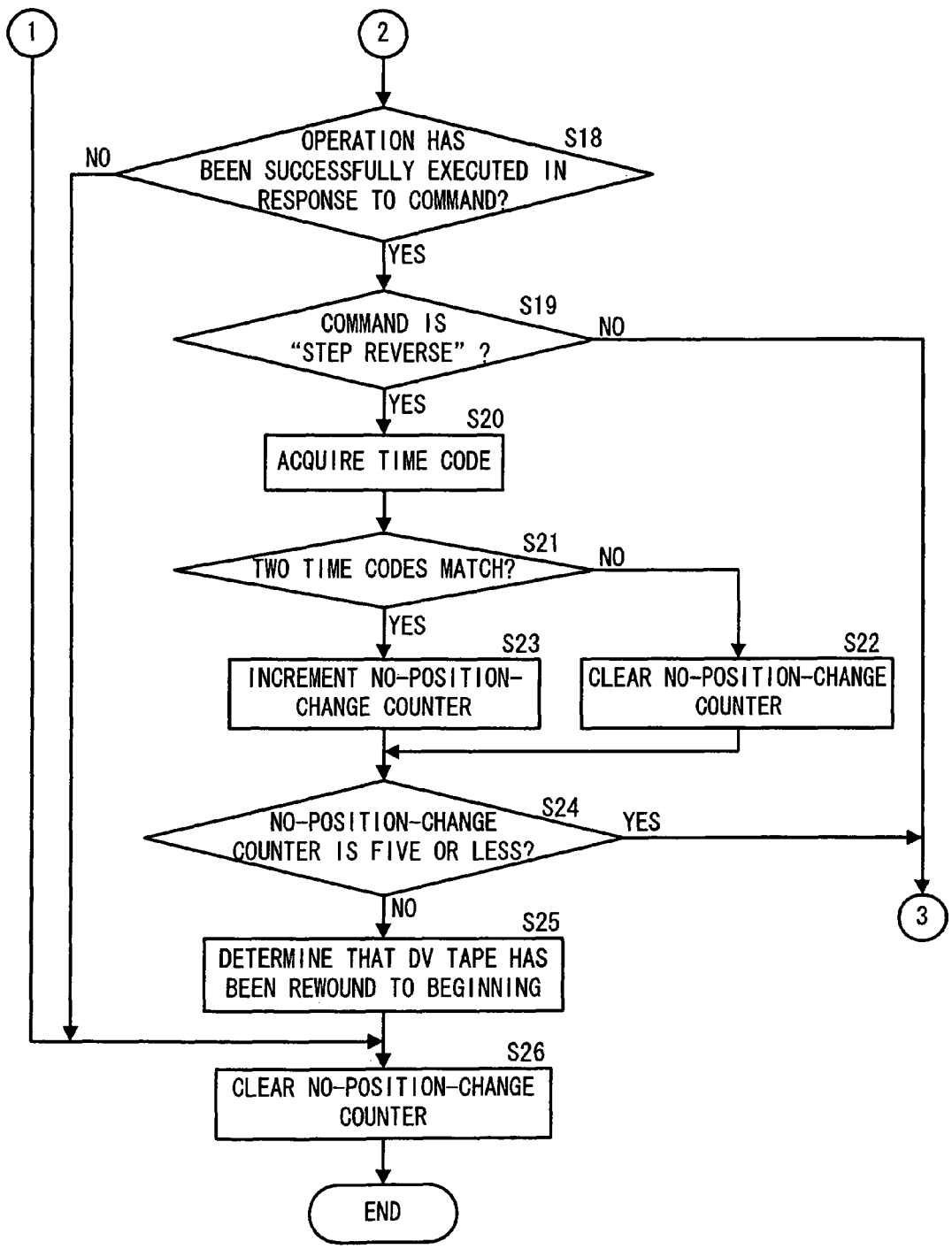
FIG. 3 is a flowchart showing the rewind process (second part) to be executed by the DVD recorder.

Referring now to FIG. 2 and FIG. 3, the steps in which the DVD recorder 1 instructs the DV camcorder 2 to rewind the DV tape 43 are described. First, the microprocessor 10 of the DVD recorder 1 specifies "Rewind" as an operation command to be issued (S1). The microprocessor 10 then determines whether or not the specified operation command to be issued is appropriate to the status of the DV camcorder 2 (whether or not there is a contradiction between the operation command to be issued and the status of the DV camcorder 2) (S2). If the operation command is not appropriate to the status (if there is a contradiction) (NO at S2), it is determined that the DV camcorder 2 is not operating in accordance with commands from the DVD recorder 1 due to some reason.

Thus, the microprocessor 10 clears a no-position-change counter, which is described later, (S26) and exits the rewind process.

If the operation command is appropriate to the status of the DV camcorder 2 (YES at S2), the microprocessor 10 of the DVD recorder 1 determines whether or not the value of a time code acquired from the DV camcorder 2 at the time (hereinafter, referred to as "current rewind position") is greater than the value of a time code at the beginning of the DV tape 43 (hereinafter, referred to as "beginning position") (S3). If it is determined that the value of the current rewind position is equal to or smaller than the value of the beginning position (NO at S3), the DV tape 43 is determined to have been already rewound to the beginning. Thus, the microprocessor 10 clears the no-position-change counter (S26) and exits the rewind process.

An operation command is determined to be appropriate to the status of the DV camcorder 2 (i.e., the result is YES at S2) when the command to be issued is any of the following: "Rewind", "Play Rewind", "Reverse Play", "Slow Reverse", "Step Reverse", and "Pause", and the command to be issued is appropriate to the status of the DV camcorder 2 without contradiction. An example is when the command to be issued is "Step Reverse" and the status of the DV camcorder 2 is "Pause".

If the value of the current rewind position is greater than the value of the beginning position (YES at S3), the microprocessor 10 of the DVD recorder 1 calculates a difference between the current rewind position and the beginning position (S4). The specific time code used here for the beginning position is "00:00:00:01". Where the acquired current rewind position is "01:30:15:20" for example, the difference is "01:30:15:19". It is to be noted that two-digit numbers separated by colons in a time code represent hour, minute, second, and frame, in order. Using "00:00:00:01" as the specific time code for the beginning position allows the DV tape 43 to be rewound to the beginning of an area where video and audio data is actually recorded.

Subsequently, the microprocessor 10 of the DVD recorder 1 determines whether or not the difference calculated at the step S4 is equal to or more than one minute (S5). If the difference is one minute or more (YES at S5), the microprocessor 10 returns to the step S2. If the difference is less than one minute (NO at S5), the microprocessor 10 then determines whether or not the difference is equal to or more than ten seconds (S6). If the difference is ten seconds or more (YES at S6), the microprocessor 10 changes the operation command to be issued from "Rewind" to "Play Rewind" (S7), and compares the operation command with the current status of the DV camcorder 2 at a step S16 described later. If the difference is less than ten seconds (NO at S6), the microprocessor 10 of the DVD recorder 1 then determines whether or not the difference is equal to or more than two seconds (S8). If the difference is two seconds or more (YES at S8), the microprocessor 10 changes the operation command to be issued from "Play Rewind" to "Reverse Play" (S9).

If the difference is less than two seconds (NO at S8), the microprocessor 10 of the DVD recorder 1 then determines whether or not the difference is equal to or more than ten frames (claimed first reference value) (S10). If the difference is ten frames or more (YES at S10), the microprocessor 10 changes the operation command to be issued from "Reverse Play" to "Slow Reverse" (S11). If the difference is less than ten frames (NO at S10), the microprocessor 10 of the DVD recorder 1 then determines whether or not the DV camcorder 2 is in the state of pause (S12). If the DV camcorder 2 is not in the pause state (NO at S12), the microprocessor 10 changes the operation command to be issued from "Slow Reverse" to "Pause" (S13).

If the DV camcorder 2 is in the pause state (YES at S12), the microprocessor 10 of the DVD recorder 1 changes the operation command to be issued into "Step Reverse" (S14), and acquires a time code at the time from the DV camcorder 2 (S15). The time code acquired at the step S15 is hereinafter referred to as "time code before step reverse operation". The time code before step reverse operation is stored in the RAM 18.

It is to be noted that the operation command "Step Reverse" is a command to instruct the DV camcorder 2 to reproduce one frame of data from the DV tape 43 in the rewind direction. The operation command "Play Rewind" is a command to instruct the DV camcorder 2 to reproduce data from the DV tape 43 in the rewind direction one and a half to two times as fast as a standard speed at the operation command "Reverse Play". The operation command "Slow Reverse" is a command to instruct the DV camcorder 2 to reproduce data from the DV tape 43 in the rewind direction at 0.3 to 0.4 times as fast as the standard speed.

Subsequently, the microprocessor 10 of the DVD recorder 1 compares an issued operation command with the current status of the DV camcorder 2 (S16). If the operation command is one for the same operation as the current status (YES at S16), the microprocessor 10 returns to the step S2. Otherwise, if the operation command is not for the same operation as the current status (NO at S16), the microprocessor 10 sends the issued operation command to the DV camcorder 2 (S17). Then, the microprocessor 10 proceeds to a process as shown in FIG. 3. In this process, the microprocessor 10 of the DVD recorder 1 determines whether or not the DV camcorder 2 has successfully executed an operation such as "Play Rewind" or "Reverse Play" in response to the sent operation command (S18). If it is determined that the operation has ended in failure (NO at S18), the microprocessor 10 of the DVD recorder 1 clears the no-position-change counter (S26), and exits the rewind process. If it is determined that the operation has been successfully executed (YES at S18), the microprocessor 10 of the DVD recorder 1 determines whether or not the issued operation command is "Step Reverse" (S19). If the operation command is not "Step Reverse" (NO at S19), the microprocessor 10 returns to the step S2.

If the issued operation command is "Step Reverse" (YES at S19), the microprocessor 10 of the DVD recorder 1 acquires a time code at the time from the DV camcorder 2 (S20). The time code acquired at the step S20 is hereinafter referred to as "time code after step reverse operation". The time code after step reverse operation is stored in the RAM 18.

Subsequently, the microprocessor 10 of the DVD recorder 1 compares the time code before step reverse operation acquired at the step S15 and stored in the RAM 18 with the time code after step reverse operation acquired at the step S20 and stored in the RAM 18 (S21). If the two time codes match (YES at S21), the microprocessor 10 increments by one the no-position-change counter therein (S23). If the two time codes are different (NO at S21), the microprocessor 10 clears the no-position-change counter (S22). For example, when the time code before step reverse operation is "00:00:00:04" and the time code after step reverse operation is "00:00:00:04", it is determined that there is no position change. Thus, the no-position-change counter is incremented. When the time code before step reverse operation is "00:00:00:04" and the time code after step reverse operation is "00:00:00:03", the no-position-change counter is cleared to zero.

The microprocessor 10 of the DVD recorder 1 then determines whether or not the no-position-change counter is less than or equal to five (S24). If the counter is five or less (YES at S24), the microprocessor 10 returns to the step S2. Otherwise, if the counter is six or more (NO at S24), the microprocessor 10 determines that the DV tape 43 has been rewound to the beginning (S25), and clears the no-position-change counter (S26) and exits the rewind process. In other words, when no position change is found six consecutive times between time codes before and after the DV camcorder 2 executes a step reverse operation at the steps S21 to S24, the DV tape 43 is determined to have been rewound to the beginning. More particularly, when time codes acquired before and after execution of a step reverse operation are both the same, e.g., "00:00:00:04", and that is repeated six consecutive times, it is determined that the DV tape 43 has been rewound to the beginning, regardless of the value of the time codes.

After the microprocessor 10 of the DVD recorder 1 determines that the DV tape 43 has been properly rewound to the beginning and exits the rewind process, it next issues a play command to the DV camcorder 2. Thereby, the microprocessor 10 instructs the DV camcorder 2 to reproduce data for proceeding of the program dubbing sequence.

The above described steps S5 to S11 is a process to cause the DV camcorder 2 to slow down the speed of rewind stepwise toward the beginning of the DV tape 43 when rewinding the DV tape 43. Therefore, the steps are not limited to the three steps "Play Rewind", "Reverse Play", and "Slow Reverse". For example, four-step slowdown may be used by adding a reverse play at another rewind speed. Alternatively, it is possible to slow down in two steps.

Further, in the step S24 to determine whether or not the number of increments of the no-position-change counter is five or less, another number of times (for example, one time) may be used as the reference instead of five times. The DVD recorder 1 can be replaced by a HDD recorder comprising substantially the same block configuration as the above.

In any case, when instructing the DV camcorder 2 to rewind the DV tape 43, the DVD recorder 1 according to this embodiment does not determine whether or not the DV tape 43 has been completely rewound, based only on whether or not an acquired time code is a specific value (e.g. "00:00:00:00"). When the rewind of the DV tape 43 comes to the end, the DVD recorder 1 instructs the DV camcorder 2 to execute a step reverse operation. Thereby, the DVD recorder 1 determines whether or not the rewind has been completed based also on whether or not time codes acquired before and after the step reverse operation are the same. Accordingly, the DVD recorder 1 can recognize the completion of the rewind of the DV tape 43 more correctly.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2005-238384 filed Aug. 19, 2005, the contents of which are hereby incorporated by reference.

What is claimed is:

1. A digital video recorder to be connected to a digital video (DV) camcorder via an IEEE 1394 serial bus, comprising:

command issuing means for issuing operation commands to the DV camcorder, the operation commands including a command to rewind a DV tape and a pause command;

time code acquiring means for acquiring a time code from the DV camcorder that is in process of rewinding the DV tape in response to a rewind command issued by the command issuing means;

calculation means for calculating a difference between a current rewind position and a beginning position on the DV tape based on the time code acquired by the time code acquiring means;

step reverse command issuing means for changing a command to be issued to the DV camcorder by the command issuing means into a step reverse command when the difference between the current rewind position and the beginning position on the DV tape, which is calculated by the calculation means, is smaller than a first reference value;

comparing means for, when a step reverse operation is executed in response to a step reverse command issued by the step reverse command issuing means, comparing a time code acquired from the DV camcorder before the execution of the step reverse command with a time code acquired from the DV camcorder after the execution of the step reverse command; and rewind completion recognizing means for recognizing completion of the rewind of the DV tape when the time codes before and after the execution of the step reverse command match as a result of the comparison by the comparing means.

2. The digital video recorder according to claim 1, further comprising:

repeat means for causing the step reverse command issuing means to repeatedly issue the step reverse command until number of times time codes before and after execution of the step reverse command match as a result of the comparison by the comparing means reaches a predetermined number, wherein when the time codes match a plural number of times in succession as a result of the repeat by the repeat means, the rewind completion recognizing means recognizes the completion of the rewind of the DV tape.

3. The digital video recorder according to claim 2, further comprising:

command changing means for changing stepwise a command to be issued to the DV camcorder by the command issuing means so as to slow down speed of the rewind with decrease of the difference between the current rewind position and the beginning position on the DV tape that is calculated by the calculation means.

4. The digital video recorder according to claim 3, wherein the digital video recorder proceeds to a process of copying data from the DV camcorder when the rewind completion recognizing means recognizes the completion of the rewind of the DV tape.

5. The digital video recorder according to claim 4, wherein the digital video recorder is a digital versatile disc (DVD) recorder.

6. The digital video recorder according to claim 2, wherein the digital video recorder proceeds to a process of copying data from the DV camcorder when the rewind completion recognizing means recognizes the completion of the rewind of the DV tape.

7. The digital video recorder according to claim 1, wherein the digital video recorder proceeds to a process of copying data from the DV camcorder when the rewind completion recognizing means recognizes the completion of the rewind of the DV tape.

* * * * *